US012755573B2

(12) United States Patent
Kim et al.

(10) Patent No.: US 12,755,573 B2
(45) Date of Patent: Oct. 6, 2026

(54) ELECTRONIC DEVICE FOR DETECTING FEATURE INFORMATION FROM FACE AND OPERATING METHOD THEREOF

(71) Applicant: ELECTRONICS AND TELECOMMUNICATIONS RESEARCH INSTITUTE, Daejeon (KR)

(72) Inventors: Ho Won Kim, Seoul (KR); Hye-sun Kim, Daejeon (KR); Chang Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 166 days.

(21) Appl. No.: 18/941,406

(22) Filed: Nov. 8, 2024

(65) Prior Publication Data

US 2025/0157251 A1 May 15, 2025

(30) Foreign Application Priority Data

Nov. 13, 2023 (KR) ........................ 10-2023-0156438
Oct. 29, 2024 (KR) ........................ 10-2024-0149906

(51) Int. Cl.
*G06V 40/16* (2022.01)
*G06V 10/774* (2022.01)

(52) U.S. Cl.
CPC .......... *G06V 40/166* (2022.01); *G06V 10/774* (2022.01); *G06V 40/171* (2022.01); *G06V 40/174* (2022.01)

(58) Field of Classification Search
CPC ... G06T 7/70; G06T 7/73; G06T 2207/30201; G06T 2207/20081; G06T 2207/20084;
(Continued)

(56) References Cited

U.S. PATENT DOCUMENTS 8,902,305 B2 12/2014 Hwang et al.
9,898,648 B2 2/2018 Oh
(Continued)

FOREIGN PATENT DOCUMENTS

CN 108345843 A 7/2018
CN 114973388 A 8/2022
(Continued)

OTHER PUBLICATIONS

Xucong Zhang et al., "Revisiting data normalization for appearance-based gaze estimation", Proceedings of the 2018 ACM symposium on eye tracking research & applications, Warsaw, Poland, Jun. 2018.
(Continued)

*Primary Examiner* — John Villecco
(74) *Attorney, Agent, or Firm* — LRK PATENT LAW FIRM

(57) ABSTRACT

An electronic device for detecting feature information from a face and an operating method of the electronic device are disclosed. The operating method may include: acquiring, via a camera, an input image including a person; setting a normalized virtual camera for generating a normalized image from the input image; generating a normalized image including a perspective projection feature that includes a face of the person based on the normalized virtual camera; inputting the normalized image to an artificial intelligence (AI) model trained to extract feature information of the face; and transforming the feature information of the face output from the AI model into a first coordinate system which is a coordinate system of the camera, using a spatial transformation relationship between the camera and the normalized virtual camera.

20 Claims, 9 Drawing Sheets

(58) Field of Classification Search
CPC ...... G06V 40/00; G06V 40/16; G06V 40/161; G06V 40/165; G06V 40/168; G06V 40/169; G06V 40/171; G06V 10/7715; G06V 10/778; G06V 10/82
See application file for complete search history.

(56) References Cited

U.S. PATENT DOCUMENTS

| | | | | |
|---|---|---|---|---|
| 2023/0343013 | A1 | 10/2023 | Weise et al. | |
| 2025/0173893 | A1* | 5/2025 | Kim | G06T 7/73 |
| 2026/0112047 | A1* | 4/2026 | Gigengack | G06T 7/50 |

FOREIGN PATENT DOCUMENTS

| | | | | | |
|---|---|---|---|---|---|
| CN | 121746162 | A | * | 3/2026 | |
| EP | 3547216 | A1 | | 10/2019 | |
| JP | 2007-249280 | A | | 9/2007 | |
| KR | 10-1001184 | B1 | | 12/2010 | |
| KR | 10-2016-0083900 | A | | 7/2016 | |
| KR | 10-1647803 | B1 | | 8/2016 | |
| KR | 10-2017-0050465 | A | | 5/2017 | |
| KR | 10-2420924 | B1 | | 7/2022 | |
| KR | 10-2023-0022388 | A | | 2/2023 | |
| WO | WO-2019164271 | A1 | * | 8/2019 | G06T 17/20 |

OTHER PUBLICATIONS

Imry Kissos et al., "Beyond Weak Perspective for Monocular 3D Human Pose Estimation", arXiv:2009.06549v1 [cs.CV] Sep. 14, 2020.
Muhammed Kocabas et al., "SPEC: Seeing People in the Wild with an Estimated Camera", 2021 IEEE/CVF International Conference on Computer Vision (ICCV), Oct. 2021.
Biwen Lei et al., "A Hierarchical Representation Network for Accurate and Detailed Face Reconstruction from In-The-Wild Images", Conference: 2023 IEEE/CVF Conference on Computer Vision and Pattern Recognition (CVPR), Jun. 2023.
Xucong Zhang et al., "MPIIGaze: Real-World Dataset and Deep Appearance-Based Gaze Estimation", arXiv:1711.09017v1 [cs.CV] Nov. 24, 2017.
Xucong Zhang et al., "ETH-XGaze: A Large Scale Dataset for Gaze Estimation Under Extreme Head Pose and Gaze Variation", ECCV 2020, LNCS 12350, pp. 365-381, 2020.

* cited by examiner

ELECTRONIC DEVICE FOR DETECTING FEATURE INFORMATION FROM FACE AND OPERATING METHOD THEREOF

CROSS-REFERENCE TO RELATED APPLICATIONS

This application claims the benefit under 35 USC § 119(a) of Korean Patent Application No. 10-2023-0156438 filed on Nov. 13, 2023, and Korean Patent Application No. 10-2024-0149906 filed on Oct. 29, 2024, in the Korean Intellectual Property Office, the entire disclosures of which are incorporated herein by reference for all purposes.

BACKGROUND

1. Field of the Invention

The following description relates to an electronic device for detecting feature information from a face and an operating method of the electronic device.

2. Description of Related Art

Extracting feature information from a human face in an input image may require normalization of the input image. Typical normalization methods include a method of cropping and scaling a region including a face in an input image and matching an input resolution of an artificial intelligence (AI) model, and a method of cropping a region including a face in an input image and performing coordinate system alignment. The typical normalization methods described above may perform normalization by cropping an input image and may thus use an orthographic projection-based AI model to detect facial feature information from a face.

SUMMARY

An aspect may provide an electronic device and method for performing image normalization that preserves a perspective projection-induced distortion feature using a normalized virtual camera to which a perspective projection model, which is a method of capturing real-world images by a real camera, is applied.

Another aspect may provide an electronic device and method for training an artificial intelligence (AI) model that outputs facial feature information that preserves a perspective projection-induced distortion feature.

Another aspect may provide an electronic device and method for projecting three-dimensional (3D) facial feature information inferred by an AI model directly onto an input image using a multiplication of spatial transformation matrices between cameras.

According to an embodiment, there is provided an operating method of an electronic device, the operating method including: acquiring, via a camera, an input image including a person; setting a normalized virtual camera for generating a normalized image that preserves a perspective projection feature from the input image; generating, based on the normalized virtual camera, a normalized image including a perspective projection feature that includes a face of the person; inputting the normalized image including the perspective projection feature to an AI model trained to extract feature information of the face; and transforming the feature information of the face output from the AI model into a first coordinate system which is a coordinate system of the camera, using a spatial transformation relationship between the camera and the normalized virtual camera.

The setting of the normalized virtual camera may include: determining a second coordinate system which is a coordinate system of the normalized virtual camera; and arranging the normalized virtual camera having the second coordinate system such that the normalized virtual camera is away from the person by a predetermined distance.

The generating of the normalized image may include: generating the normalized image having a set size when training the AI model such that the AI model infers a corresponding relationship between pixels of the face included in the normalized image and points on a surface of the face in a space from which the input image is acquired, based on the spatial transformation relationship in which the perspective projection feature is reflected independent of a pose of the face included in the normalized image.

The determining of the second coordinate system may include: determining a target x-axis corresponding to an x-axis of the first coordinate system; determining a target z-axis corresponding to a unit vector from an origin of the first coordinate system toward an origin of a third coordinate system which is a coordinate system of the face; determining a target y-axis based on the target z-axis and the target x-axis; and determining the target x-axis, the target y-axis, and the target z-axis to be the second coordinate system.

The operating method may further include: determining whether the face of the person is in the input image; and in response to the face being in the input image, determining orthographic projection-based initial head pose information from the input image. The setting of the normalized virtual camera may include setting the normalized virtual camera based on the initial head pose information.

The AI model may be trained based on a training data set including a plurality of training images and a ground truth (GT) of feature information corresponding to the plurality of training images. The plurality of training images may include: a reference image including a reference person, and augmented images which are images augmented from the reference image in a 3D space based on an error range that is based on settings of the normalized virtual camera to reduce an error in at least one of a position and a pose of the face included in the normalized image that is potentially caused by the settings of the normalized virtual camera. The GT of the feature information corresponding to the plurality of training images may include: a GT of feature information corresponding to the reference image, and augmented GTs which are GTs augmented from the GT of the feature information corresponding to the reference image in the 3D space.

The AI model may be configured to: output, based on a perspective projection model, the feature information including at least one of 3D face shape information, 3D head pose information, first 3D gaze information, second 3D gaze information, 3D landmark information, 2D landmark information, face part information, and facial expression information of the face. The first 3D gaze information and the second 3D gaze information may be based on the second coordinate system which is the coordinate system of the normalized virtual camera and the third coordinate system which is the coordinate system of the face, respectively.

The 3D head pose information may include a transformation relationship between the second coordinate system and the third coordinate system.

The transforming into the first coordinate system may include: transforming the feature information of the face into the first coordinate system, based on 3D head pose information including the transformation relationship between the second coordinate system which is the coordinate system of the normalized virtual camera and the third coordinate system which is the coordinate system of the face, included in the feature information of the face, and on a transformation relationship between the first coordinate system and the second coordinate system.

The operating method may further include: determining a confidence of each of the 3D gaze information and the 2D landmark information included in the feature information of the face; and determining whether to output the feature information of the face based on the confidence of each of the 3D gaze information and the 2D landmark information.

According to an embodiment, there is provided a non-transitory computer-readable storage medium storing instructions that, when executed by a processor, cause the processor to perform the operating method.

According to an embodiment, there is provided an operating method of an electronic device, the operating method including: generating a training data set including a plurality of training images and a GT of feature information corresponding to the plurality of training images; and training, based on the training data set, an AI model such that the AI model outputs the feature information corresponding to the plurality of training images in response to the training images being received. The plurality of training images may include: a reference image including a reference person, and augmented images which are images augmented from the reference image in a 3D space based on an error range that is based on settings of a normalized virtual camera to reduce an error in at least one of a position and a pose of a face included in a normalized image that is potentially caused by the settings of the normalized virtual camera. The GT of the feature information corresponding to the plurality of training images may include: a GT of feature information corresponding to the reference image, and augmented GTs which are GTs augmented from the GT of the feature information corresponding to the reference image in the 3D space.

The training of the AI model may include: training the AI model such that the AI model outputs the feature information corresponding to the training images including at least one of 3D face shape information, 3D head pose information, first 3D gaze information, second 3D gaze information, 3D landmark information, 2D landmark information, face part information, and facial expression information of a face of a person included in the training images. The first 3D gaze information and the second 3D gaze information may be based on a coordinate system of the normalized virtual camera and a coordinate system of the face, respectively.

The training of the AI model may include: training the AI model such that at least one of a first loss that is based on the 3D face shape information and the 3D head pose information, a second loss that is based on the 3D head pose information and the first 3D gaze information, or a third loss that is based on the 3D head pose information and the 3D landmark information is minimized.

According to an example embodiment, there is provided an electronic device including: a memory including instructions; and a processor configured to execute the instructions. When executed individually and/or collectively by the processor, the instructions may cause the electronic device to: acquire, via a camera, an input image including a person; set a normalized virtual camera for generating a normalized image that preserves a perspective projection feature from the input image; generate, based on the normalized virtual camera, a normalized image including a perspective projection feature that includes a face of the person; input the normalized image including the perspective projection feature to an AI model trained to extract feature information of the face; and transform the feature information of the face output from the AI model into a first coordinate system of the camera, using a spatial transformation relationship between the camera and the normalized virtual camera.

When executed individually and/or collectively by the processor, the instructions may cause the electronic device to: determine a second coordinate system which is a coordinate system of the normalized virtual camera; and arrange the normalized virtual camera having the second coordinate system such that the normalized virtual camera is away from the person by a predetermined distance.

When executed individually and/or collectively by the processor, the instructions may cause the electronic device to: determine a target x-axis corresponding to an x-axis of the first coordinate system; determine a target z-axis corresponding to a unit vector from an origin of the first coordinate system toward an origin of a third coordinate system which is a coordinate system of the face; determine a target y-axis based on the target z-axis and the target x-axis; and determine the target x-axis, the target y-axis, and the target z-axis to be the second coordinate system.

When executed individually and/or collectively by the processor, the instructions may cause the electronic device to: determine whether the face of the person is in the input image; and in response to the face being in the input image, determine orthographic projection-based initial head pose information from the input image and set the normalized virtual camera based on the initial head pose information.

The AI model may be trained based on a training data set including a plurality of training images and a GT of feature information corresponding to the plurality of training images. The plurality of training images may include: a reference image including a reference person, and augmented images which are images augmented from the reference image in a 3D space based on an error range that is based on settings of the normalized virtual camera to reduce an error in at least one of a position and a pose of the face included in the normalized image that is potentially caused by the settings of the normalized virtual camera. The GT of the feature information corresponding to the plurality of training images may include: a GT of feature information corresponding to the reference image, and augmented GTs which are GTs augmented from the GT of the feature information corresponding to the reference image in the 3D space.

The AI model may be configured to: output, based on a perspective projection model, the feature information including at least one of 3D face shape information, 3D head pose information, first 3D gaze information, second 3D gaze information, 3D landmark information, 2D landmark information, face part information, and facial expression information of the face. The first 3D gaze information and the second 3D gaze information may be based on the second coordinate system which is the coordinate system of the normalized virtual camera and the third coordinate system which is the coordinate system of the face, respectively.

The 3D head pose information may include a transformation relationship between the second coordinate system and the third coordinate system.

When executed individually and/or collectively by the processor, the instructions may cause the electronic device to: transform the feature information of the face into the first coordinate system, using the spatial transformation relationship between the camera and the normalized virtual camera, based on the 3D head pose information including the transformation relationship between the second coordinate system which is the coordinate system of the normalized virtual camera and the third coordinate system which is the coordinate system of the face, included in the feature information of the face, and on a transformation relationship between the first coordinate system and the second coordinate system.

According to example embodiments of the present disclosure, performing image normalization that may preserve a perspective projection-induced distortion feature may overcome the limitations of typical cropping and scaling-based image normalization methods in a case where a distortion occurs due to perspective projection, for example, in a case of capturing an image of a person at close range.

According to example embodiments of the present disclosure, deep learning based on image normalization that preserves a perspective projection-induced distortion feature may provide an AI model that may learn about a perspective projection-induced distortion occurring by a change in distance, rotation, and position between a person and a camera.

According to example embodiments of the present disclosure, using a metric correlation between coordinate systems may project 3D facial feature information directly onto an input image without a complex 3D fitting-based optimization process, thereby minimizing computational resources.

DETAILED DESCRIPTION

Figure 1:
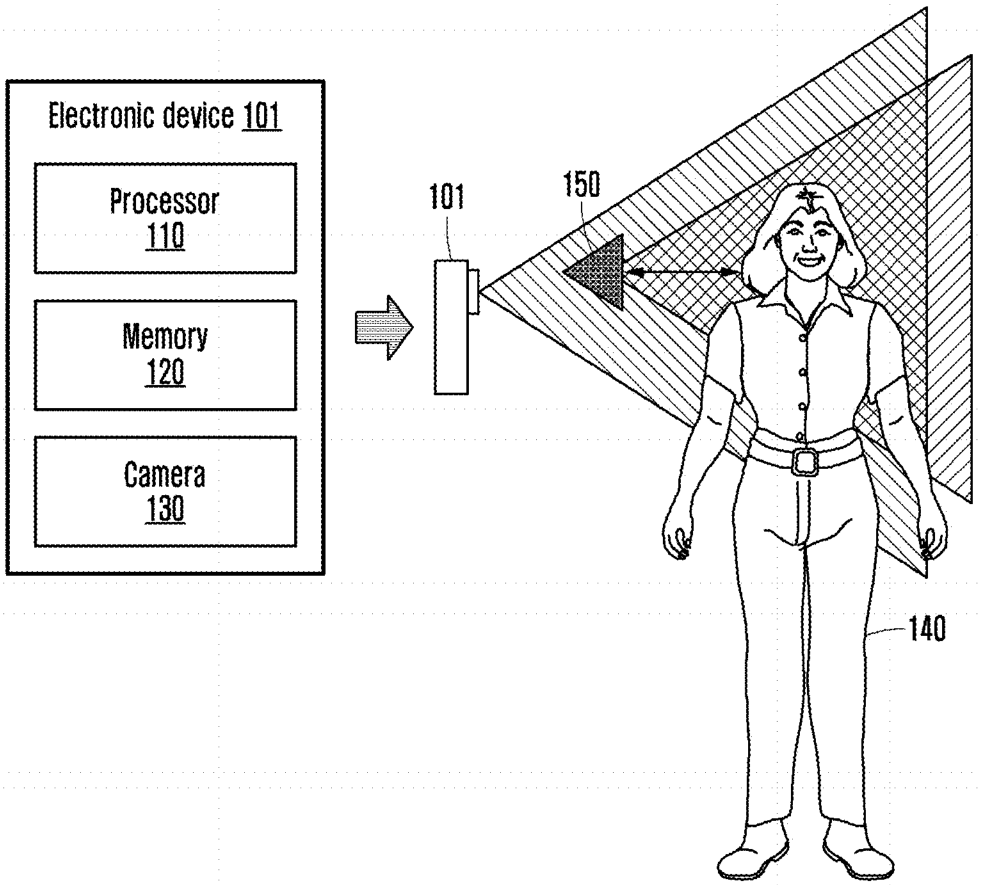
FIG. 1 is a diagram illustrating an electronic device according to an embodiment of the present disclosure.

The following structural or functional descriptions of example embodiments are merely intended for the purpose of describing the example embodiments, and the example embodiments may be implemented in various forms. The example embodiments are not meant to be limited, but it is intended that various modifications, equivalents, and alternatives are also covered within the scope of the claims.

Various changes or modifications may be made to the example embodiments. Here, the example embodiments are not construed as limited to the disclosure and should be understood to include all changes, equivalents, and replacements within the idea and the technical scope of the disclosure.

Although terms "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component, or intervening components may be present. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

In addition, when describing the example embodiments with reference to the accompanying drawings, like reference numerals refer to like components, and a repeated description related thereto is omitted. In describing the example embodiments, where it is determined that a detailed description of the related art would unnecessarily obscure the essence of the example embodiments, such detailed description is omitted.

Hereinafter, the example embodiments will be described in detail with reference to the accompanying drawings.

FIG. 1 is a diagram illustrating an electronic device according to an embodiment of the present disclosure.

Referring to FIG. 1, shown is an electronic device 101 according to an embodiment. The electronic device 101 may include a processor 110, a memory 120, and a camera 130. The processor 110, the memory 120, and the camera 130 may communicate with each other via a bus, a network on a chip (NoC), a peripheral component interconnect express (PCIe), or the like. Although the electronic device 101 is shown in FIG. 1 as including only those components necessary for the description of embodiments of the present disclosure, it will be apparent to a person of ordinary skill in the art that the electronic device 101 may include many other general-purpose components in addition to those described above.

The processor 110 may serve to perform overall functions for controlling the electronic device 101. The processor 110 may execute programs and/or instructions stored in the memory 120 to provide overall control of the electronic device 100. The processor 110 may be implemented as, but is not limited to, a central processing unit (CPU), a graphics processing unit (GPU), an application processor (AP), or the like within the electronic device 100.

The memory 120 may be hardware that stores data processed in the electronic device 101 and data to be processed by the electronic device 101. The memory 120 may also store applications, drivers, or the like to be run or driven by the electronic device 101. The memory 120 may include, as non-limiting examples, a volatile memory such as a dynamic random-access memory (DRAM), and/or a non-volatile memory. According to an embodiment, the memory 120 may include a non-transitory computer-readable recording medium that stores instructions and/or programs.

The camera 130 may capture still images and moving images (e.g., video). According to an embodiment, the camera 130 may include one or more lenses, image sensors, image signal processors (ISPs), or flashes.

According to an embodiment, a user of the electronic device 101 may use the electronic device 101 to capture an image of a person 140. The electronic device 101 may output feature information of a face of the person 140 from an input image acquired by capturing the image of the person 140. The feature information of a face used herein may also be referred to herein as facial feature information.

According to an embodiment, the electronic device 101 may acquire, via the camera 130, the input image including the person 140. The electronic device 101 may acquire a normalized image including the face of the person 140 from the input image. The electronic device 101 may set a normalized virtual camera 150 to acquire the normalized image from the input image. A method of setting the normalized virtual camera 150 will be described in detail below with reference to FIG. 3. The normalized virtual camera 150 may be a perspective projection model-based normalized camera, rather than a typical orthographic projection model-based normalized camera.

According to embodiments, an electronic device may acquire facial feature information about a human face from a normalized image. The electronic device may input the normalized image to a trained artificial intelligence (AI) model. In this case, the AI model may be a model trained to output facial feature information from a normalized image. The electronic device may acquire the facial feature information output from the trained AI model receiving the normalized image as an input.

According to an embodiment, the electronic device may determine a confidence of the facial feature information. In this case, when the facial feature information is reliable, the electronic device may provide the facial feature information. In contrast, when the facial feature information is unreliable, the electronic device may output an error.

To perform the operations described above, normalization of an input image may be required. Hereinafter, typical normalization methods will be described.

Figure 2:
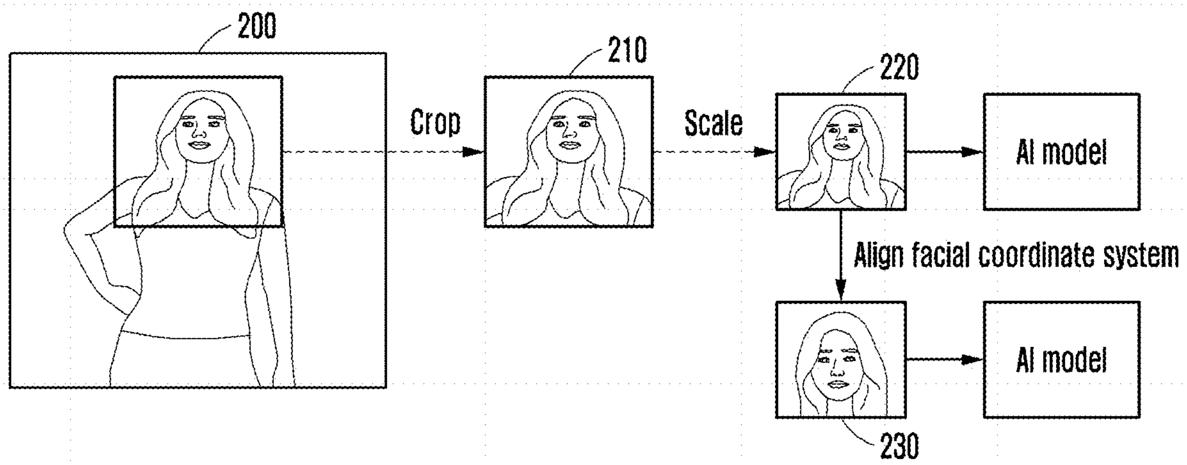
FIG. 2 is a diagram illustrating a typical method of detecting facial feature information according to the related art.

FIG. 2 is a diagram illustrating a typical method of detecting facial feature information according to the related art.

To extract feature information from a human face, a combination of cameras for this purpose has been typically used. For example, typically, a combination of special-purpose sensors (e.g., a time of flight (TOF) sensor, a light detection and ranging (lidar) sensor, etc.) and two or more multiple cameras may be used to extract feature information from a human face. However, this method may have limitations in that it requires a specific combination of cameras to extract facial feature information. For example, an electronic device that does not include a specific camera combination may not be able to extract facial feature information.

To extract feature information from a human face based on a color image of a single camera, without being limited by such a specific camera combination, a deep learning-based method may be used. In this case, for example, to input an input image 200 to an AI model trained through deep learning, normalizing the input image 200 may be required. The input image 200 may be an image including a person acquired through a camera of an electronic device.

A typical normalization method may crop a region including a face in the input image 200 to acquire a cropped image 210, scale the cropped image 210 to generate a first normalized image 220, and match a resolution of the first normalized image 220 to an input resolution of the AI model. Another typical normalization method may align a coordinate system of the face of the first normalized image 220 to generate a second normalized image 230, and map specific parts (e.g., eyes, nose, mouth, etc.) of the face included in the second normalized image 230 permanently to specific positions.

The method of cropping the region including the face to generate the cropped image 210 may compromise a perspective projection-based transformation relationship between a camera and a space in which an image of a person is captured. As the perspective projection-based transformation relationship is compromised, the AI model may not readily infer three-dimensional (3D) information about the space (e.g., 3D head pose information, 3D gaze information, etc.) directly from the feature information. In this case, for the AI model to infer the 3D information about the space, an additional optimization technique may be required.

The AI model that receives, as an input, the first normalized image 220 or the second normalized image 230 may be an orthographic projection-based model that does not preserve characteristics of perspective projection (which may also be referred to herein as "perspective projection features"). The orthographic projection-based model may not learn about the perspective projection features, and therefore may not consider a perspective projection-induced distortion (which may refer to a distortion caused by perspective projection) based on a distance between the camera and the face.

In a case where the first normalized image 220 includes a face of a user captured from a position at which such a perspective projection-induced distortion increases, the orthographic projection-based model may have an increasing inference error because it does not consider the perspective projection-induced distortion. For example, in a case where a normalized image that includes a face of a person located close to a camera, a face (e.g., a face of a person turning their head back and forth) that is rotated by 45 degrees) (°) or more at close range from a camera, or a face of a person located at a position deviating far from the center of the input image 200 is input to the orthographic projection-based model, the inference error may increase.

To further increase the precision by pixelwise matching of face parts, the method of aligning a coordinate system of the face for the first normalized image 220 to generate the second normalized image 230.

In addition, since a typical image-based gaze detection method may require detecting a gaze direction in connection with a space, a virtual camera disposed at a specific distance from a face included in an image captured by a real camera may be used, rather than using the cropping described above. In this case, a normalized image may be acquired from the virtual camera. The typical image-based gaze detection method (e.g., "revisiting data normalization for appearance-based gaze estimation" (ETRA 2018)) may use an inverse transformation using a physical transformation relationship between the real camera and the virtual camera. However, the typical gaze detection method may have limitations in defining a coordinate system of a normalized virtual camera, which may increase an inference error when a face rotation angle between the virtual camera and a user exceeds 30°.

In the typical gaze detection method, a gaze direction may be defined as a unit vector between a gaze target and an origin of a facial coordinate system (which is a coordinate system of a face) of a user located in a space, relative to a camera coordinate system (which is a coordinate system of a camera). However, in this case, most image-based gaze detection methods using AI models may use 3D head pose information inferred based on the image cropping described above, and thus an inference error may increase when a face rotation angle between the virtual camera and the user exceeds 30°. Accordingly, the typical gaze detection method may have a limitation in that it may not be used for a face rotation of 30° or greater, other than head-on gaze, due to a combination of a method of setting a coordinate system of the normalized virtual camera and an error of the head pose information which is prior input information used to set the coordinate system.

Hereinafter, a normalization method that may preserve a perspective projection feature, which is not the cropping-based normalization or the normalization used by the typical gaze detection method described above, will be described.

Figure 3:
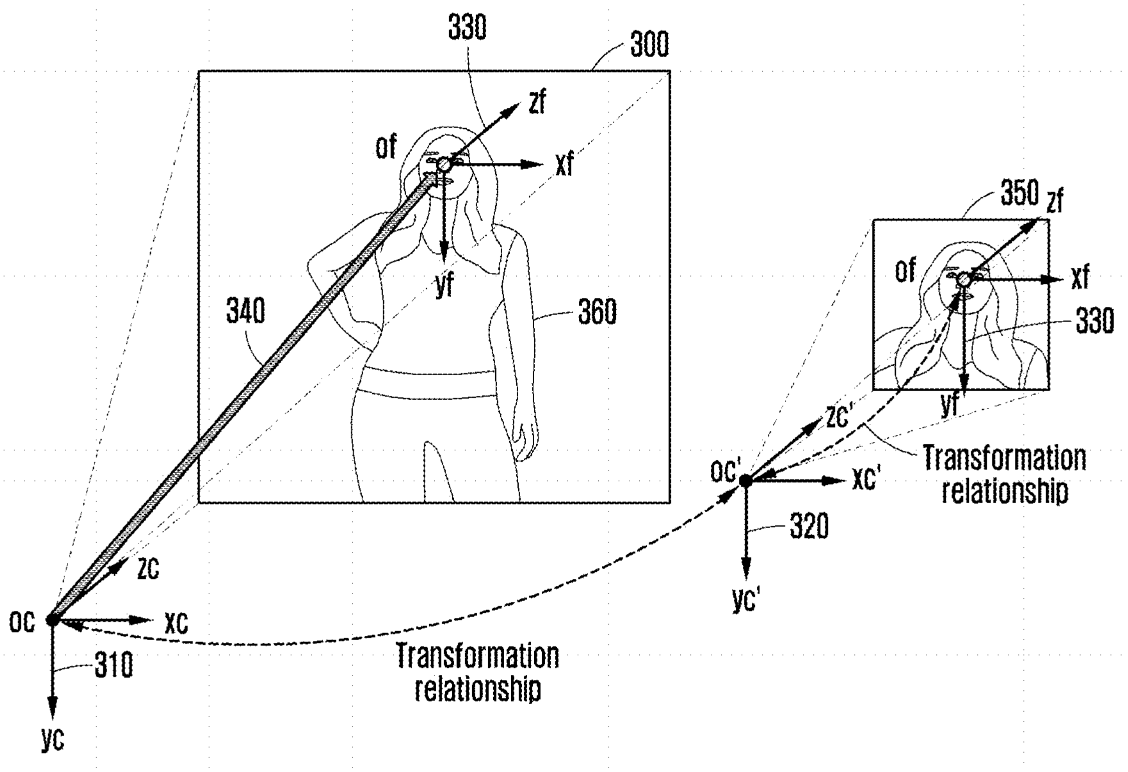
FIG. 3 is a diagram illustrating an example of setting a normalized virtual camera according to an embodiment of the present disclosure.

FIG. 3 is a diagram illustrating an example of setting a normalized virtual camera according to an embodiment of the present disclosure.

Referring to FIG. 3, shown are a coordinate system 310 (e.g., a first coordinate system) of a camera capturing an input image 300, a coordinate system 320 (e.g., a second coordinate system) of a normalized virtual camera, and a coordinate system 330 (e.g., a third coordinate system) of a face. For ease of explanation, only the coordinate systems are shown in FIG. 3, and the camera and the normalized camera are omitted.

According to an embodiment, the input image 300 may be an image captured by the camera (e.g., a camera of an electronic device), and a normalized image 350 may be an image acquired from the normalized virtual camera. In this case, feature information of a face of a person 360 extracted based on the normalized image 350 may be represented based on the coordinate system 330 of the face or the coordinate system 320 of the normalized virtual camera. To represent, in the input image 300, 3D information represented in the coordinate system 330 of the face, a transformation into the coordinate system 310 of the camera may be required.

According to an embodiment, the electronic device may transform the 3D information represented in the coordinate system 330 of the face into the coordinate system 310 of the camera, based on a transformation relationship between the coordinate system 310 of the camera and the coordinate system 320 of the normalized virtual camera and a transformation relationship between the coordinate system 320 of the normalized virtual camera and the coordinate system 330 of the face. For example, the electronic device may transform the 3D information represented in the coordinate system 330 of the face into the coordinate system 310 of the camera, using a multiplication of a matrix representing the transformation relationship between the coordinate system 310 of the camera and the coordinate system 320 of the normalized virtual camera and a matrix representing the transformation relationship between the coordinate system 320 of the normalized virtual camera and the coordinate system 330 of the face. The transformation relationship between the coordinate system 310 of the camera and the coordinate system 320 of the normalized virtual camera may include information about a position and a rotation between the coordinate system 310 of the camera and the coordinate system 320 of the normalized virtual camera. The transformation relationship between the coordinate system 320 of the normalized virtual camera and the coordinate system 330 of the face may include information about a position and a rotation between the coordinate system 320 of the normalized virtual camera and the coordinate system 330 of the face. By simplifying a spatial transformation between the cameras using such a matrix multiplication, the 3D information represented in the coordinate system 330 of the face may be projected onto the coordinate system 310 of the camera.

For example, the electronic device may determine a transformation relationship between the coordinate system 310 of the camera and the coordinate system 330 of the face, through a multiplication of a first matrix representing the transformation relationship between the coordinate system 310 of the camera and the coordinate system 320 of the normalized virtual camera and a second matrix representing the transformation relationship between the coordinate system 320 of the normalized virtual camera and the coordinate system 330 of the face.

According to an embodiment, in the coordinate system 310 of the camera, an origin (oc) may correspond to the center of the camera (e.g., the center of a lens). In the coordinate system 310 of the camera, an x-axis (xc) may correspond to a rightward direction from the origin (oc) relative to a direction in which the camera views. In the coordinate system 310 of the camera, a y-axis (yc) may correspond to a downward direction of the camera. In the coordinate system 310 of the camera, a z-axis (zc) may correspond to the direction in which the camera views.

According to an embodiment, in the coordinate system 330 of the face, an origin (of) may correspond to the center between both eyes. In the coordinate system 330 of the face, an x-axis (xf) may correspond to a rightward direction from the origin (of) when the face is viewed from the front. In the coordinate system 330 of the face, a y-axis (yf) may correspond to a direction from the origin (of) toward the mouth. In the coordinate system 330 of the face, a z-axis (zf) may correspond to a direction from the origin (of) toward the back of the head.

According to an embodiment, the electronic device may determine the coordinate system 320 of the normalized virtual camera based on the coordinate system 310 of the camera and the coordinate system 330 of the face. The electronic device may determine a target x-axis (xc') corresponding to the x-axis (xc) of the coordinate system 310 of the camera. The electronic device may determine a target z-axis (zc') corresponding to a vector 340 from the origin (oc) of the coordinate system 310 of the camera toward the origin (of) of the coordinate system 330 of the face. The electronic device may determine a target y-axis (yc') based on the target z-axis (zc') and the target x-axis (xc'). The electronic device may determine, to be the target y-axis (yc'), a direction based on an outer product of the target z-axis (zc') and the target x-axis (xc'). The electronic device may determine the target x-axis (xc'), the target y-axis (yc'), and the target z-axis (zc') to be the coordinate system 320 of the normalized virtual camera.

According to an embodiment, the electronic device may arrange the normalized virtual camera having the target x-axis (xc'), the target y-axis (yc'), and the target z-axis (zc') as the coordinate system 320 to be separate from the face of the person 360 by a predetermined distance (e.g., 1 meters (m)). In this case, to arrange the normalized virtual camera, a position of the face in a space may be required. However, accurately knowing the position of the face may not be easy in the step of arranging the normalized virtual camera. Therefore, the electronic device may roughly estimate the position of the face using a typical orthographic projection-based method of detecting 3D head pose information of the face.

According to an embodiment, the electronic device may crop and scale the input image 300, and may input a resulting image into an orthographic projection-based AI model. The electronic device may detect, from the AI model, a position of a two-dimensional (2D) landmark and a position of a 3D landmark of the face. The electronic device may detect a 3D head pose of the face between the coordinate system 310 and the coordinate system 330 through an optimization process that minimizes an error between the 2D landmark and a value acquired by projecting the detected 3D landmark based on a perspective projection model. The orthographic projection-based AI model may be a model trained to output initial head pose information. The initial head pose information may include the transformation relationship between the coordinate system 330 of the face and the coordinate system 310 of the camera. The initial head pose information may include information about a position and a rotation between the coordinate system 330 of the face and the coordinate system 310 of the camera. The coordinate system 320 of the normalized virtual camera may be defined as being located at a specific distance relative to the coordinate system 330 of the face based on the initial head pose information.

According to an embodiment, the electronic device may arrange the normalized virtual camera based on the initial head pose information. Based on the initial head pose information, the electronic device may arrange the normalized virtual camera such that the normalized virtual camera is away from the face of the person 360 by a predetermined distance. Based on the initial head pose information, the electronic device may arrange the normalized virtual camera such that an origin (oc') is away from the origin (of) by a predetermined distance and the target z-axis (zc') faces the origin (of).

According to an embodiment, the electronic device may determine a camera factor of the normalized virtual camera. The camera factor of the normalized virtual camera may include a focal length and a scale. The electronic device may determine the camera factor of the normalized virtual camera based on an input resolution of the AI model described below with reference to FIG. 4.

According to an embodiment, since the initial head pose information is output from the orthographic projection-based model, a perspective projection feature may not be reflected therein, and an error may thus be present. This error may be removed by the AI model that receives, as an input, the normalized image 350. A method of removing such an error will be described in detail below with reference to FIG. 6. The perspective projection feature may include a change in size depending on distance. For example, the perspective projection feature may include a feature that an object is larger as it is closer to an observer (e.g., the camera) and smaller as it is farther away therefrom. The perspective projection feature may also include a feature that makes actually parallel lines appear to meet at one point. In this case, for example, the perspective projection feature may include a feature that makes parallel railroad tracks appear to meet at one point. The perspective projection feature may also include an angle distortion. For example, the perspective projection feature may include a feature that the shape of an object is distorted and its proportion changes as the object is laterally away from the line of sight of an observer. However, the features described above may be provided only as examples of the perspective projection feature, and the perspective projection feature may not be limited to these examples.

A perspective projection-induced distortion described herein may correspond to the perspective projection feature. The perspective projection-induced distortion may include a size distortion. For example, the perspective projection-induced distortion may make an object appear larger than it is when it is closer to an observer (e.g., the camera) and smaller than it is when it is farther away from the observer (e.g., the camera). The perspective projection-induced distortion may also include an angle distortion. For example, as an object is closer to an observer (e.g., the camera) and a viewing angle of the observer is wider, the proportion of the object may be deformed, making the object appear different than it actually is. The perspective projection-induced distortion may also include a convergence distortion. For example, the perspective projection feature that makes actually parallel lines appear to meet at one point may also be a type of perspective distortion. The perspective projection-induced distortion may also include a shape distortion. For example, the shape of an object may appear deformed depending on a viewpoint (e.g., front, side, etc.).

According to an embodiment, the electronic device may generate the normalized image 350 using the normalized virtual camera.

According to an embodiment, the electronic device may generate the normalized image 350 having a size that is set when training the AI model such that the AI model infers a corresponding relationship between pixels of the face included in the normalized image 350 and points on the surface of the face in the space from which the input image 300 is acquired, based on a spatial transformation relationship in which the perspective projection feature is reflected, independent of the pose of the face included in the normalized image 350.

By arranging the normalized camera as described above, the normalized image 350 may be reliably acquired even when the person 360 is moving.

Figure 4:
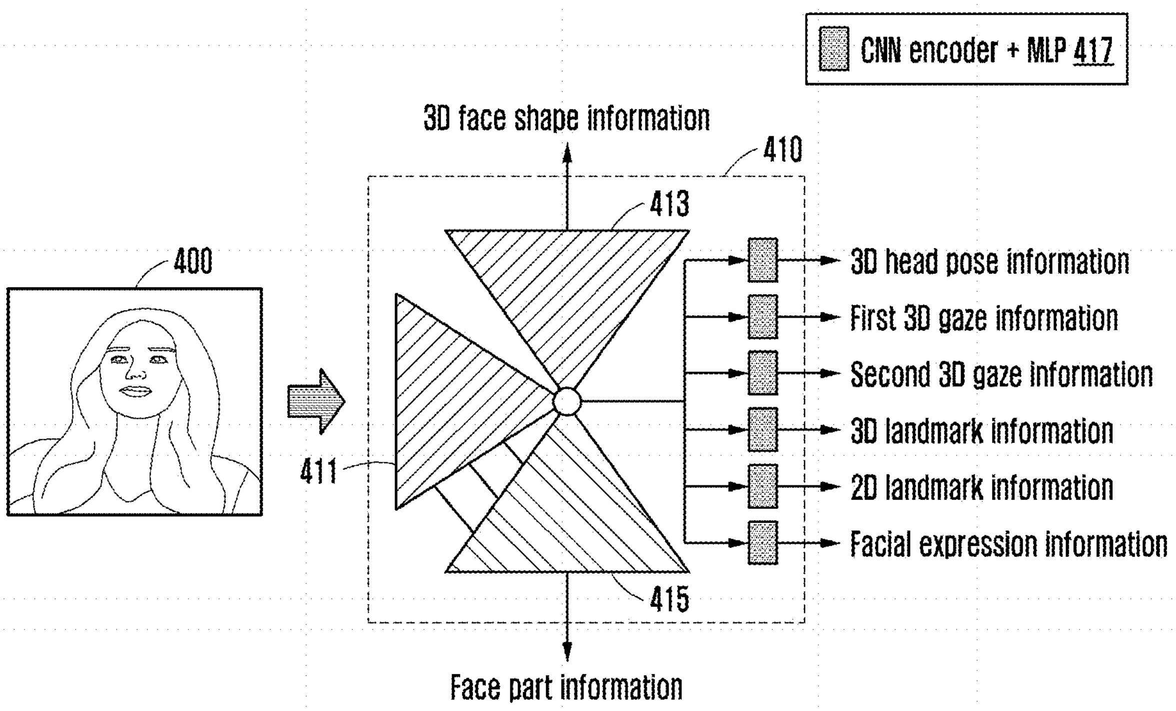
FIG. 4 is a diagram illustrating an example of an artificial intelligence (AI) model according to an embodiment of the present disclosure.

FIG. 4 is a diagram illustrating an example of an AI model according to an embodiment of the present disclosure.

According to an embodiment, an AI model 410 may receive a normalized image 400 as an input. The normalized image 400 may be an image acquired from a normalized virtual camera arranged by the method described above with reference to FIG. 3.

According to an embodiment, the AI model 410 may be a perspective projection-based model. The AI model 410 may extract feature information based on the perspective projection-based model. The AI model 410 may include a first network 411, a second network 413, a third network 415, and a plurality of fourth networks (e.g., 417). The first network 411 may be connected to the second network 413, the third network 415, and the plurality of fourth networks 417. The AI model 410 may output facial feature information upon receiving the normalized image 400 as an input.

According to an embodiment, the facial feature information may include at least one of 3D face shape information, 3D head pose information, first 3D gaze information, second 3D gaze information, 3D landmark information, 2D landmark information, face part information, and facial expression information of a face.

According to an embodiment, the first network 411 may include a convolution neural network (CNN)-based encoder. The first network 411 may be a model trained to extract a plurality of features from the normalized image 400. A method of extracting the plurality of features from the normalized image 400 is not limited to any particular examples, and various methods that are readily employed by a person of ordinary skill in the art to which the present disclosure pertains may be employed. The features extracted from the first network 411 may include image features extracted from an image.

According to an embodiment, the second network 413 may include a CNN-based decoder. The second network 413 may be a model trained to output the 3D face shape information based on the plurality of features extracted from the first network 411. The second network 413 may output the 3D face shape information based on the plurality of features extracted from the first network 411. The 3D face shape information may be 3D information about the shape of the face. For example, the 3D face shape information may include the 3D information indicating, for example, how much the cheekbones protrude, how much the eyes are recessed, what the shape of the face is, and how much the nose is upturned. The 3D face shape information may be represented based on a coordinate system of the face.

According to an embodiment, the third network 415 may include a CNN-based decoder. The third network 415 may be a model trained to output the face part information based on the plurality of features extracted from the first network 411. The third network 415 may output the face part information based on the plurality of features extracted from the first network 411. The face part information may be 2D information. For example, the face part information may include the 2D information indicating, for example, which part is an eye, which part is a nose, which part is a mouth, and which part is an eyebrow in the normalized image 400.

According to an embodiment, the fourth networks 417 may include a CNN-based encoder and a multilayer perceptron (MLP) for outputting various feature information of the face. The plurality of fourth networks 417 may each be a model trained to output the feature information of the face based on the plurality of features output from the first network 411. The plurality of fourth networks 417 may each output the feature information of the face based on the plurality of features output from the first network 411.

For example, any one of the plurality of fourth networks 417 may output the 3D head pose information. The 3D head pose information may represent a transformation relationship between a coordinate system of the normalized virtual camera and a coordinate system of the face. The 3D head pose information may include a matrix representing the transformation relationship between the coordinate system of the normalized virtual camera and the coordinate system of the face. The 3D head pose information may include information about a position and a rotation between the coordinate system of the normalized virtual camera and the coordinate system of the face. The 3D head pose information may be represented based on the coordinate system of the virtual camera.

For example, any one of the plurality of fourth networks 417 may output the first 3D gaze information. The first 3D gaze information may be represented based on the coordinate system of the normalized virtual camera. The first 3D gaze information may include information about a direction in which a person included in the normalized image 400 is gazing, represented based on the coordinate system of the normalized virtual camera.

For example, any one of the plurality of fourth networks 417 may output the second 3D gaze information. The second 3D gaze information may be represented based on the coordinate system of the face. The second 3D gaze information may include information about a direction in which the person included in the normalized image 400 is gazing, represented based on the coordinate system of the face.

For example, any one of the plurality of fourth networks 417 may output the 3D landmark information. The 3D landmark information may be represented based on the coordinate system of the normalized virtual camera. The 3D landmark information may include three-dimensionally represented landmark information of the face.

For example, any one of the plurality of fourth networks 417 may output the 2D landmark information. The 2D landmark information may be represented based on the coordinate system of the normalized virtual camera. The 2D landmark information may include two-dimensionally represented landmark information of the face.

For example, any one of the plurality of fourth networks 417 may output the facial expression information. The facial expression information may include 2D information including, for example, facial expressions (e.g., frown, laugh, cry, etc.) included in the normalized image 400.

However, it will be apparent to a person of ordinary skill in the art that the plurality of fourth networks 417 may include other fourth networks capable of outputting various other specific information other than the feature information described above.

According to an embodiment, the electronic device may check (or determine) a confidence before providing the facial feature information described above. Hereinafter, a method of determining a confidence will be described.

Figure 5:
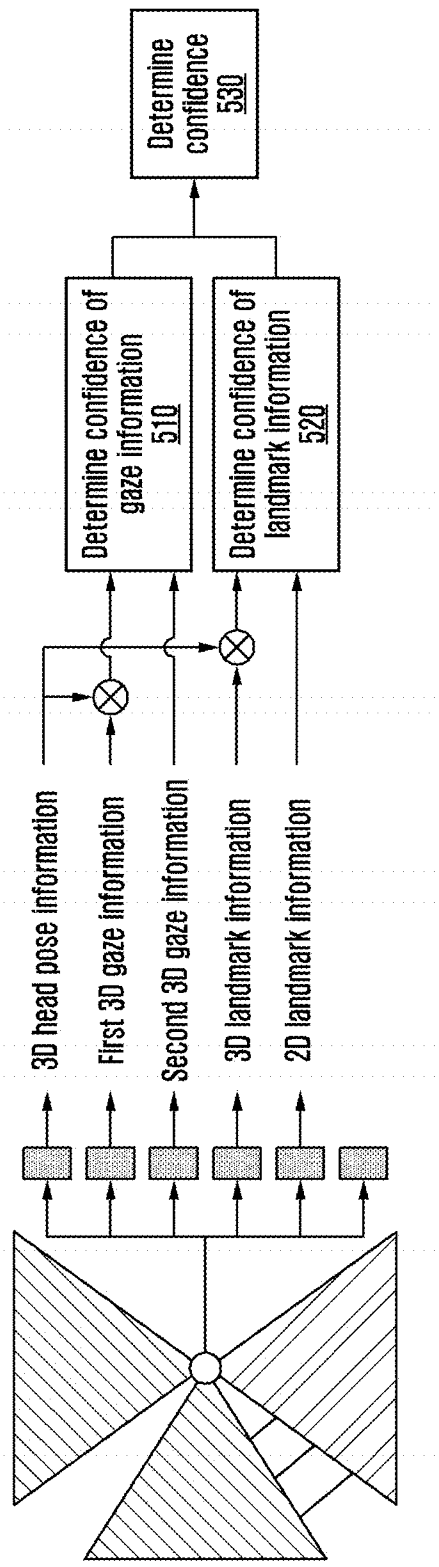
FIG. 5 is a diagram illustrating an example of determining a confidence according to an embodiment of the present disclosure.

FIG. 5 is a diagram illustrating an example of determining a confidence according to an embodiment of the present disclosure.

According to an embodiment, an electronic device may determine a confidence of gaze information and a confidence of landmark information based on 3D head pose information. The 3D head pose information may be based on a coordinate system of a normalized virtual camera. The 3D head pose information may include a transformation relationship between the coordinate system of the normalized virtual camera and a coordinate system of a face. The 3D head pose information may include a matrix representing the transformation relationship between the coordinate system of the normalized virtual camera and the coordinate system of the face. The 3D head pose information may include a spatial transformation relationship between the coordinate system of the normalized virtual camera and the coordinate system of the face. It will be apparent to a person of ordinary skill in the art that a transformation relationship and a transformation of a coordinate system described herein may include a spatial transformation relationship and a spatial transformation, respectively.

According to an embodiment, first 3D gaze information and second 3D gaze information may be based on the coordinate system of the normalized virtual camera and the coordinate system of the face, respectively, as described above with reference to FIG. 4. Based on the 3D head pose information, the electronic device may transform the first 3D gaze information to be represented in the coordinate system of the face. The electronic device may spatially transform the first 3D gaze information based on the 3D head pose information. The transformed first 3D gaze information and the second 3D gaze information may be represented in the same coordinate system.

At block 510, the electronic device may determine a confidence of gaze information. The electronic device may compare the transformed first 3D gaze information and the second 3D gaze information. The electronic device may determine a difference between the first 3D gaze information and the second 3D gaze information. The electronic device may determine whether the gaze information is reliable based on whether an absolute value of the difference exceeds a first threshold value. For example, in response to the absolute value of the difference being greater than the first threshold value, the electronic device may determine the first 3D gaze information and/or the second 3D gaze information to be unreliable. For example, in response to the absolute value of the difference being less than or equal to the first threshold value, the electronic device may determine the first 3D gaze information and the second 3D gaze information to be reliable.

At block 520, the electronic device may determine a confidence of landmark information. The electronic device may transform 3D landmark information into 2D landmark information based on the 3D head pose information. The electronic device may spatially transform the 3D landmark information into the 2D landmark information based on the 3D head pose information. The electronic device may compare the transformed 2D landmark information and the 2D landmark information output from an AI model. The electronic device may determine a difference between the transformed 2D landmark information and the 2D landmark information. The electronic device may determine whether the landmark information is reliable based on whether an absolute value of the difference exceeds a second threshold value. For example, in response to the absolute value of the difference being greater than the second threshold value, the electronic device may determine the 3D landmark information and/or the 2D landmark information to be unreliable. For example, in response to the absolute value of the difference being less than or equal to the second threshold value, the electronic device may determine the 3D landmark information and the 2D landmark information to be reliable.

At block 530, the electronic device may determine whether feature information output from the AI model is reliable. The electronic device may determine whether the feature information output from the AI model is reliable based on whether the gaze information is reliable and whether the landmark information is reliable.

According to an embodiment, when it is determined that the gaze information is reliable and the landmark information is reliable, the electronic device may determine that the feature information output from the AI model is reliable. When it is determined that even at least one of the gaze information and the landmark information is unreliable, the electronic device may determine that the feature information output from the AI model is unreliable.

According to an embodiment, when it is determined that the feature information output from the AI model is reliable, the electronic device may provide the feature information output from the AI model to a user. For example, the electronic device may provide various services based on the feature information output from the AI model.

According to an embodiment, when the feature information output from the AI model is reliable, the electronic device may transform the feature information into a coordinate system of a camera based on the 3D head pose information and a transformation relationship between the coordinate system of the camera and the coordinate system of the normalized virtual camera. When the feature information output from the AI model is reliable, the electronic device may transform the feature information into the coordinate system of the camera based on the 3D head pose information and a matrix multiplication of a matrix including the transformation relationship between the coordinate system of the camera and the coordinate system of the normalized virtual camera. The 3D head pose information may include the transformation relationship between the coordinate system of the normalized virtual camera and the coordinate system of the face.

According to an embodiment, the electronic device may display, in the input image, the feature information output from the AI model. The electronic device may display, in the input image, feature information that is based on the coordinate system of the normalized virtual camera in the feature information, using the transformation relationship between the coordinate system of the camera capturing the input image and the coordinate system of the normalized virtual camera. The electronic device may display, in the input image, the feature information that is based on the coordinate system of the normalized virtual camera, using the matrix representing the transformation relationship between the coordinate system of the camera capturing the input image and the coordinate system of the normalized virtual camera. The electronic device may display, in the input image, feature information that is based on the coordinate system of the face in the feature information, using the transformation relationship between the coordinate system of the normalized virtual camera and the coordinate system of the face and the transformation relationship between the coordinate system of the camera capturing the input image and the coordinate system of the normalized virtual camera.

Figure 6:
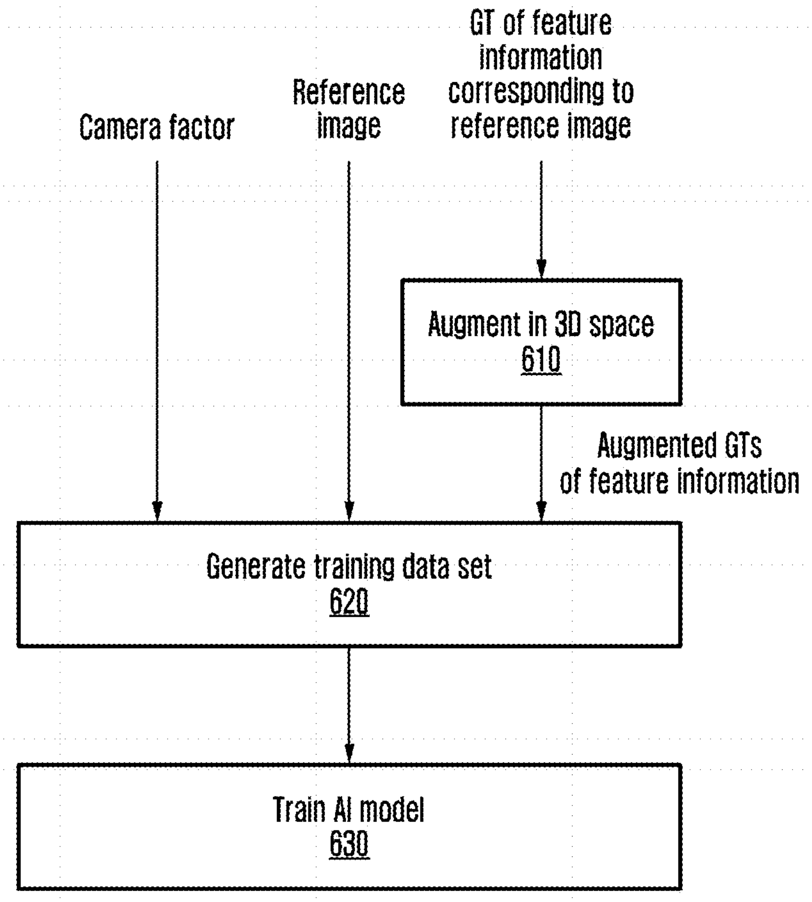
FIG. 6 is a diagram illustrating an example of generating a training data set for training an AI model according to an embodiment of the present disclosure.

FIG. 6 is a diagram illustrating an example of generating a training data set for training an AI model according to an embodiment of the present disclosure.

According to an embodiment, an electronic device may generate a training data set based on a camera factor, a reference image, and a ground truth (GT). The electronic device may generate training data based on a plurality of reference images. However, for ease of explanation, a method of generating training data based on a single reference image will be described below as an example.

According to an embodiment, the reference image may correspond to an input image acquired from a camera of the electronic device in an inference step. The camera factor may include a camera factor of the camera used to acquire the reference image. The GT may be true data for feature information of a face included in the reference image. The GT may be a GT of feature information corresponding to the reference image. For example, the GT of the feature information corresponding to the reference image may include a GT for each of feature information of a face included in reference image. For example, the GT of the feature information corresponding to the reference image may include a GT of at least one of 3D face shape information, 3D head pose information, first 3D gaze information, second 3D gaze information, 3D landmark information, 2D landmark information, face part information, or facial expression information of the face included in the reference image.

At block 610, the electronic device may augment the GT of the feature information corresponding to the reference image in a 3D space. The electronic device may augment the GT of the 3D head pose information corresponding to the reference image by adding a fine noise component that is independent of a rotation axis of a coordinate system of the face and a direction of movement.

For example, the electronic device may move, by a first threshold range (e.g., 5 cm), a coordinate system of a normalized virtual camera disposed such that the GT of the feature information corresponding to the reference image is acquired from the reference image. For example, the electronic device may rotate, by a second threshold range (e.g., 5°), the coordinate system of the normalized virtual camera disposed such that the GT of the feature information corresponding to the reference image is acquired from the reference image.

According to an embodiment, the electronic device may augment the GT of the 3D head pose information by moving and/or rotating the coordinate system of the normalized virtual camera as described above. The electronic device may generate a plurality of augmented GTs of the 3D head pose information by varying the degrees of movement and/or rotation.

According to an embodiment, the electronic device may reconstruct the remaining feature information based on the augmented GT of the 3D head pose information. The augmented GT of the 3D head pose information and the reconstructed remaining information may be referred to as a GT of the augmented feature information.

At block 620, the electronic device may generate a training data set based on the camera factor, the reference image, and GTs of the augmented feature information.

According to an embodiment, the electronic device may transform the reference image and the camera factor such that they correspond to the GT of the augmented feature information. The electronic device may transform the reference image and the camera factor such that they correspond to the augmented GT of the 3D head pose information. The transformed reference image may be an augmented image that is an image augmented from the reference image in the 3D space.

According to an embodiment, the electronic device may label the GT of the feature information corresponding to the reference image with respect to the reference image. The electronic device may label the GT of the augmented feature information with respect to the transformed reference image. The electronic device may generate the training data set through such labeling.

According to an embodiment, the training data set may include a plurality of training images and a plurality of GTs of feature information respectively corresponding to the plurality of training images. The plurality of training images may include augmented images that are images augmented from the reference image in the 3D space. A GT of feature information corresponding to each of the plurality of training images may include the GT of the feature information corresponding to the reference image that is labeled to the reference image. The GT of the feature information corresponding to each of the plurality of training images may include the GT of the augmented feature information in the 3D space that is labeled to each of the images augmented from the reference image in the 3D space.

According to an embodiment, the plurality of training images may include an image including a reference person. The plurality of training images may include augmented images that are images augmented from the reference image in the 3D space based on an error range according to settings of the normalized virtual camera to reduce an error in at least one of a position and a pose of a face included in a normalized image that may occur according to the settings of the normalized virtual camera. The error range according to the settings of the virtual camera may be a range of errors due to an initial head pose.

At block 630, the electronic device may train an AI model based on the training data set. Based on the training data set, the electronic device may train an AI model such that the AI model outputs a GT of feature information corresponding to a training image in response to the training image being input.

By augmenting the reference image and the GT of the feature information corresponding to the reference image in the 3D space, the AI model may reliably output the feature information even if the normalized virtual camera is incorrectly set within a threshold range. The augmentation in the 3D space may remove an error from using initial head pose information output from the orthographic projection-based model shown in FIG. 3.

Hereinafter, training an AI model will be described.

Figure 7:
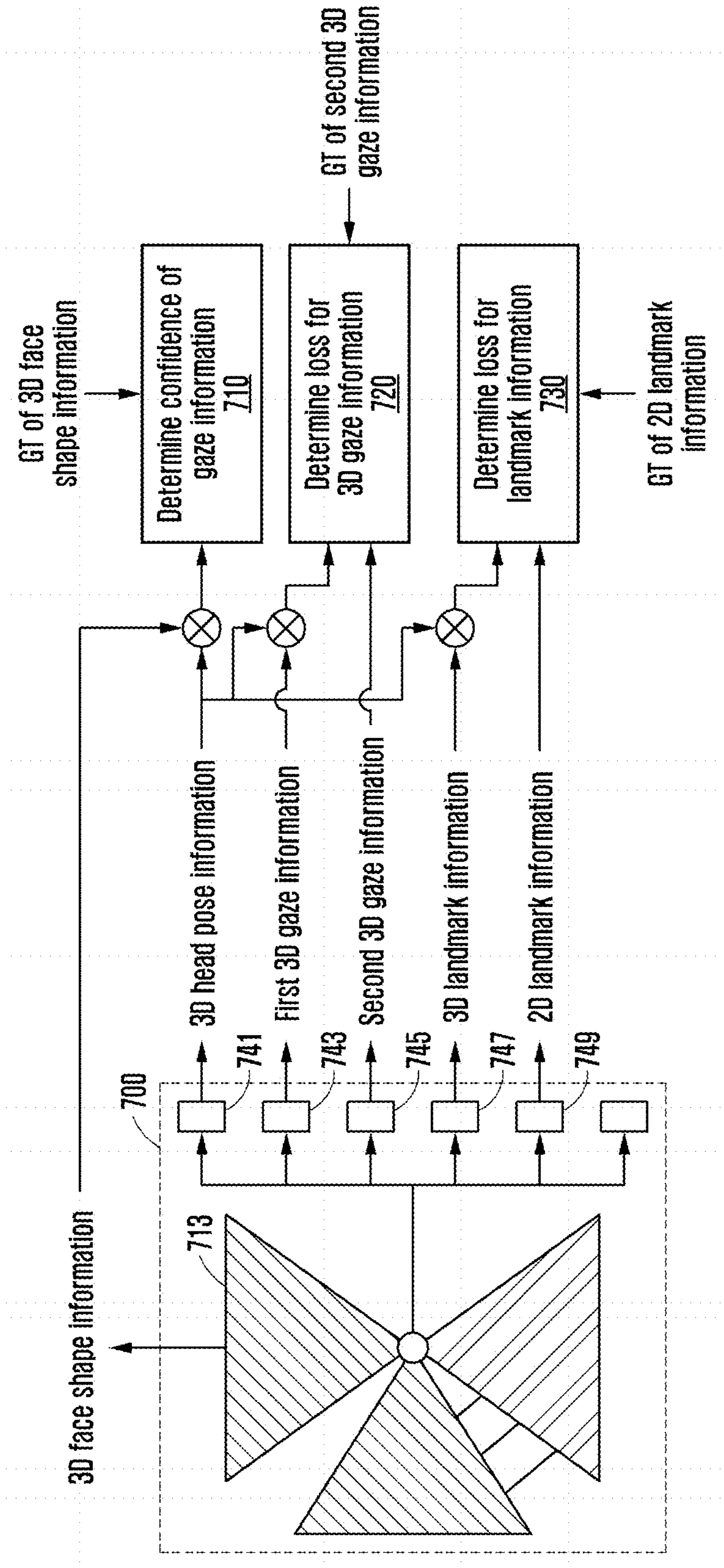
FIG. 7 is a diagram illustrating an example of training an AI model according to an embodiment of the present disclosure.

FIG. 7 is a diagram illustrating an example of training an AI model according to an embodiment of the present disclosure.

Referring to FIG. 7, an electronic device may input a training image to an AI model 700. Upon receiving the training image, the AI model 700 may output feature information of a face included in the training image. The feature information of the face, or facial feature information, has been described above, and thus a more detailed description thereof will be omitted here. Also, of the feature information, face part information and facial expression information that are not related to the three dimensions, are not shown in FIG. 7.

According to an embodiment, the electronic device may determine a loss based on the feature information of the face output from the AI model 700 in response to the input of the training image and a GT of the feature information corresponding to the training image.

According to an embodiment, the electronic device may transform 3D face shape information based on 3D head pose information." The electronic device may spatially transform the 3D face shape information based on the 3D head pose information. The electronic device may transform the 3D face shape information represented in a coordinate system of the face to be represented in a coordinate system of a normalized virtual camera based on the 3D head pose information.

At block 710, the electronic device may determine a loss (e.g., a first loss) based on the transformed 3D face shape information and a GT of the 3D face shape information. The electronic device may train a second network 713 and a fourth network 741 of the AI model 700 such that the first loss is minimized.

According to an embodiment, the electronic device may transform first 3D gaze information based on the 3D head pose information. The electronic device may transform the first 3D gaze information represented in the coordinate system of the face to be represented in the coordinate system of the normalized virtual camera based on the 3D head pose information.

At block 720, the electronic device may determine a loss for 3D gaze information. The electronic device may determine a loss (e.g., a second loss) based on the transformed first 3D gaze information and a GT of second 3D gaze information. The electronic device may train the fourth network 741 and a fourth network 743 of the AI model 700 such that the second loss is minimized.

At block 720, the electronic device may determine a loss for 3D gaze information. The electronic device may determine the loss based on the second 3D gaze information output from a fourth network 745 and a GT of the second 3D gaze information. The electronic device may train the fourth network 745 of the AI model 700 such that the loss is minimized.

According to an embodiment, the electronic device may transform 3D landmark information into 2D landmark information based on the 3D head pose information.

At block 730, the electronic device may determine a loss (e.g., a third loss) based on the transformed 2D landmark information and a GT of the 2D landmark information. The electronic device may train the fourth network 741 and a fourth network 747 of the AI model 700 such that the third loss is minimized.

At block 730, the electronic device may determine a loss based on the 2D landmark information output from a fourth network 749 and the GT of the 2D landmark information. The electronic device may train the fourth network 749 of the AI model 700 such that the loss is minimized.

According to an embodiment, the electronic device may train the AI model 700 such that at least one of the first loss that is based on the 3D face shape information and the 3D head pose information, the second loss that is based on the 3D head pose information and the first 3D gaze information, and the third loss that is based on the 3D head pose information and the 3D landmark information is minimized.

The 3D head pose information may affect the first loss, the second loss, and the third loss. Based on a correlation of feature information associated with the first loss, the second loss, and the third loss with the 3D head pose information, the AI model 700 may learn a perspective projection feature. The AI model 700 may reliably output feature information even in a situation where there is a perspective projection-induced distortion.

Figure 8:
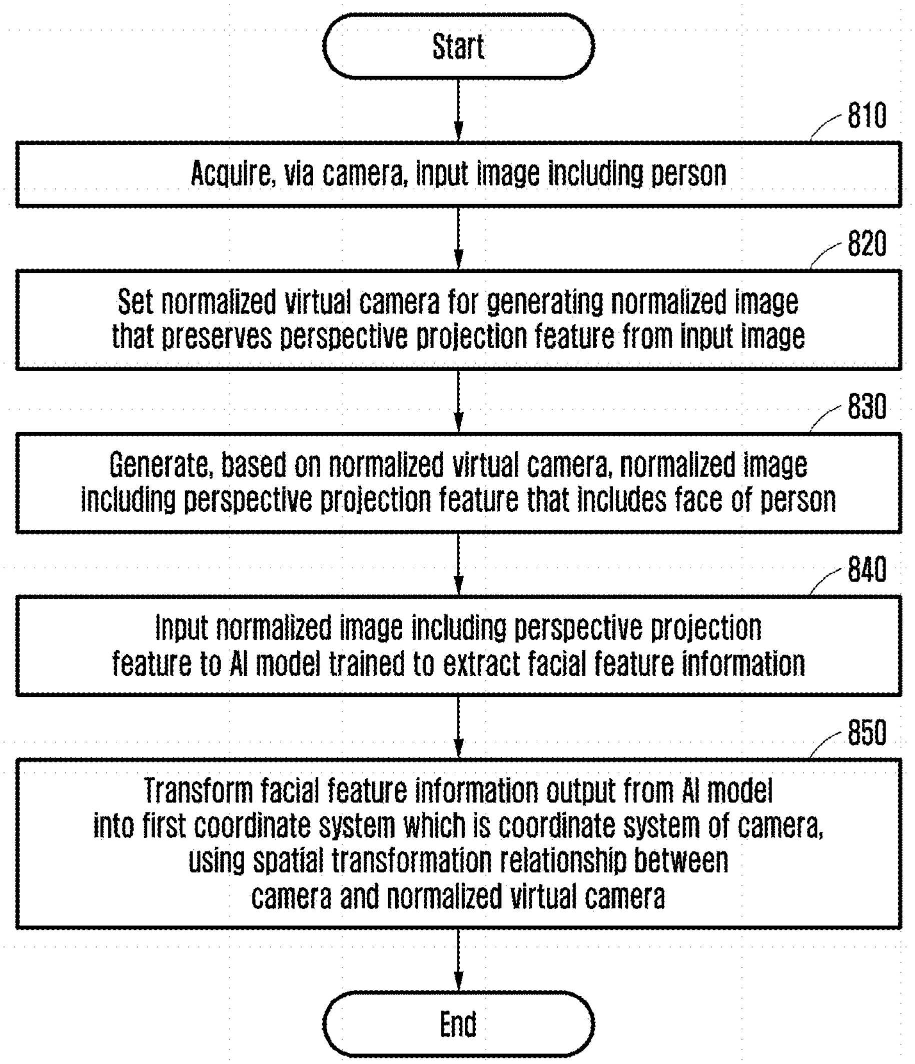
FIG. 8 is a flowchart illustrating an operating method of an electronic device according to an embodiment of the present disclosure.

FIG. 8 is a flowchart illustrating an operating method of an electronic device according to an embodiment of the present disclosure.

The operations described below may be performed sequentially but are not necessarily performed sequentially. For example, the order of the operations may be reversed, and at least two operations may be performed in parallel. Also, in some embodiments, some operations may be omitted. Operations 810 to 850 described below with reference to FIG. 8 may be performed by at least one component of an electronic device according to an embodiment. For example, at least one processor of the electronic device may execute, individually and/or collectively, instructions stored in a memory and the instructions may cause the electronic device to perform operations 810 to 850 described below.

At operation 810, the electronic device may acquire, via a camera, an input image including a person.

At operation 820, the electronic device may set a normalized virtual camera for generating a normalized image that preserves therein a perspective projection feature from the input image.

At operation 830, the electronic device may generate, based on the normalized virtual camera, a normalized image including the perspective projection feature that includes a face of the person.

At operation 840, the electronic device may input the normalized image including the perspective projection feature to an AI model trained to extract feature information of the face.

At operation 850, the electronic device may transform the feature information of the face output from the AI model into a first coordinate system which is a coordinate system of the camera, using a spatial transformation relationship between the camera and the normalized virtual camera.

A more detailed description of operations 810 to 850 is omitted here as the operations have been described in detail above with reference to FIGS. 1 through 7.

Figure 9:
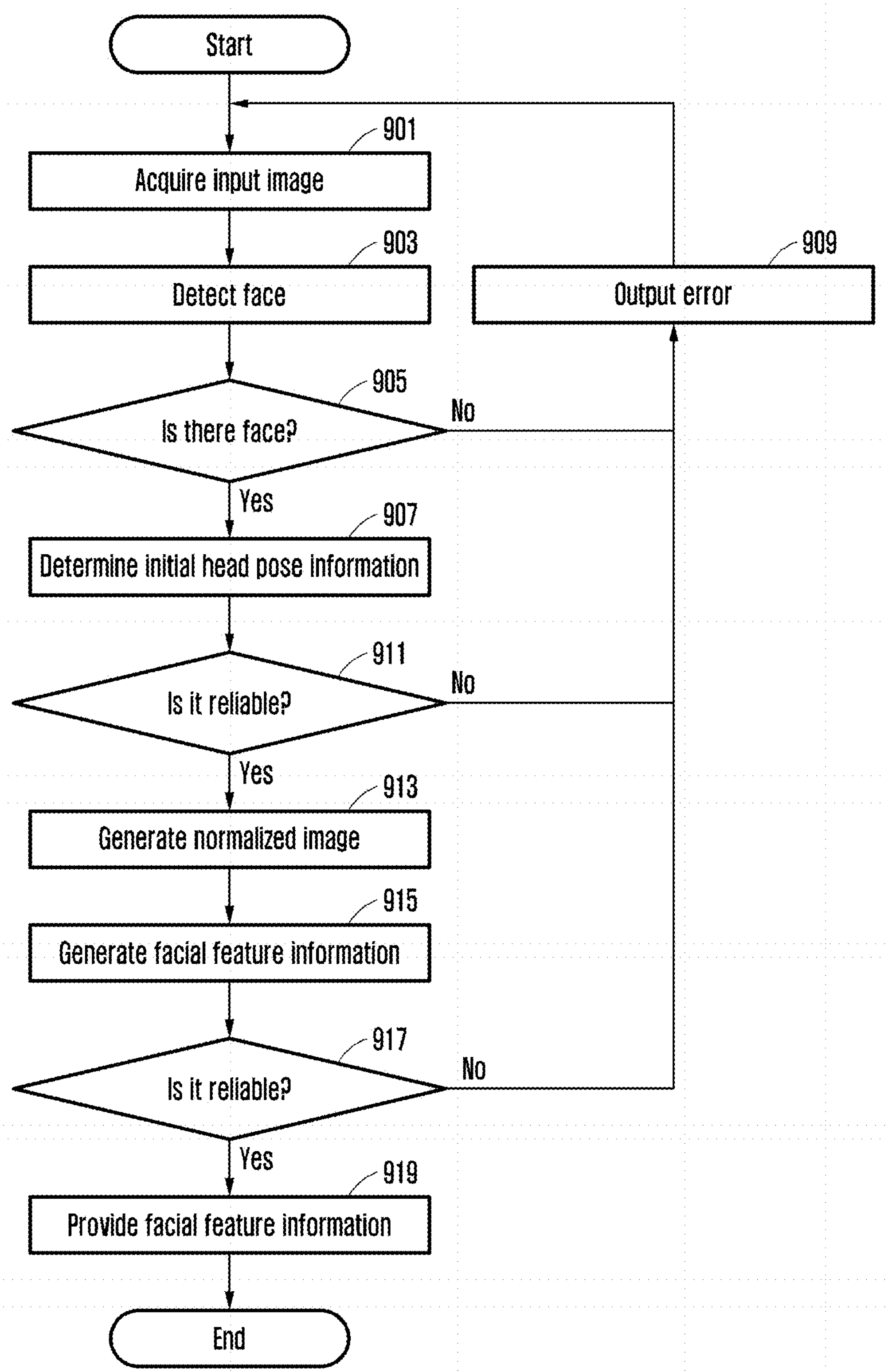
FIG. 9 is a flowchart illustrating an operating method of an electronic device according to an embodiment of the present disclosure.

FIG. 9 is a flowchart illustrating an operating method of an electronic device according to an embodiment of the present disclosure.

The operations described below may be performed sequentially but are not necessarily performed sequentially. For example, the order of the operations may be reversed, and at least two operations may be performed in parallel. Also, in some embodiments, some operations may be omitted. Operations 901 to 919 described below with reference to FIG. 9 may be performed by at least one component of an electronic device according to an embodiment. For example, at least one processor of the electronic device may execute, individually and/or collectively, instructions stored in a memory and the instructions may cause the electronic device to perform operations 901 to 919 described below.

At operation 901, the electronic device may acquire an input image.

The electronic device may acquire the input image via a camera. The input image may include a human face.

At operation 903, the electronic device may detect a face.

The electronic device may detect a human face in the input image. A method of extracting a human face is not limited to any particular example, and various examples readily adopted by a person of ordinary skill in the art may also be used as the method.

At operation 905, the electronic device may determine whether there is a face.

In response to the face being present as a result of the detecting, the electronic device may perform operation 907. In response to the face being absent as the result of the detecting, the electronic device may perform operation 909.

At operation 907, the electronic device may determine initial head pose information.

The electronic device may determine the initial head pose information using an orthographic projection-based model.

At operation 909, the electronic device may output an error.

When it is determined at operation 905 that the face is absent, the electronic device may output an error indicating the absence of the face. When it is determined at operation 911 that the initial head pose information is unreliable, the electronic device may output an error indicating that the initial head pose information is unreliable. When it is determined at operation 917 that facial feature information is unreliable, the electronic device may output an error indicating that the facial feature information is unreliable.

At operation 911, the electronic device may determine whether the initial head pose information is reliable.

When the initial head pose information is reliable, the electronic device may perform operation 913. When the initial head pose information is unreliable, the electronic device may perform operation 909. The electronic device may determine whether the initial head pose information is reliable, based on 3D landmark information, the initial head pose information, and the 2D landmark information, which are acquired from the orthographic projection-based AI model. For example, the electronic device may determine whether the initial head pose information is reliable in a similar manner to determining a loss for landmark information.

At operation 913, the electronic device may generate a normalized image.

The electronic device may set a normalized virtual camera based on the initial head pose information and generate the normalized image from the normalized virtual camera.

At operation 915, the electronic device may generate facial feature information.

The electronic device may input the normalized image to the AI model to generate the facial feature information.

At operation 917, the electronic device may determine whether the facial feature information is reliable.

The electronic device may determine whether the facial feature information is reliable based on a confidence of gaze information and/or a confidence of landmark information. When the facial feature information is reliable, the electronic device may perform operation 919. When the facial feature information is unreliable, the electronic device may perform operation 909.

At operation 919, the electronic device may provide the facial feature information.

The electronic device may transform the facial feature information and display it on the input image. The electronic device may provide various services based on the facial feature information.

According to embodiments of the present disclosure, as a perspective projection feature is preserved, facial feature information may be reliably output even in a condition under which a perspective projection-induced distortion may occur, for example, image capturing at close range, face rotation by 45° or more, or the like.

The methods described herein according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine-readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing a computer program include, by way of example, both general and special purpose microprocessors, and any one or more processors of any kind of digital computer. Generally, a processor may receive instructions and data from a read-only memory or a random-access memory, or both. Elements of a computer may include at least one processor for executing instructions and one or more memory devices for storing instructions and data. Generally, a computer may also include, or be operatively coupled, to receive data from or transfer data to, or both, one or more mass storage devices for storing data, e.g., magnetic, magneto-optical disks, or optical discs. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in, special-purpose logic circuitry.

In addition, non-transitory computer-readable media may be any available computer storage media that may be accessed by a computer.

Although the present disclosure includes details of a plurality of specific example embodiments, the details should not be construed as limiting any invention or a scope that can be claimed, but rather should be construed as being descriptions of features that may be unique to specific example embodiments of specific inventions. Specific features described in the present disclosure in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or that all the shown operations must be performed in order to acquire a preferred result. In some specific cases, multitasking and parallel processing may be advantageous. In addition, it should not be understood that the separation of various device components of the aforementioned example embodiments is required for all the example embodiments, and it should be understood that the aforementioned program components and devices may be integrated into a single software product or packaged into multiple software products.

The example embodiments described in the present disclosure and the drawings are intended merely to present specific examples in order to aid in understanding of the present disclosure but are not intended to limit the scope of the present disclosure. It will be apparent to those skilled in the art that various modifications based on the technical spirit of the present disclosure, as well as the disclosed example embodiments, can be made.

What is claimed is:

1. An operating method of an electronic device, comprising:

acquiring, via a camera, an input image comprising a target object;

setting a normalized virtual camera for generating a normalized image that preserves a perspective projection feature from the input image;

generating, based on the normalized virtual camera, a normalized image comprising a perspective projection feature that comprises the target object;

inputting the normalized image comprising the perspective projection feature to an artificial intelligence (AI) model trained to extract feature information of the target object; and transforming the feature information of the target object output from the AI model into a first coordinate system which is a coordinate system of the camera, using a spatial transformation relationship between the camera and the normalized virtual camera.

2. The operating method of claim 1, wherein the setting of the normalized virtual camera comprises:

determining a second coordinate system which is a coordinate system of the normalized virtual camera; and arranging the normalized virtual camera having the second coordinate system such that the normalized virtual camera is away from the target object by a predetermined distance.

3. The operating method of claim 1, wherein the generating of the normalized image comprises:

generating the normalized image having a set size when training the AI model such that the AI model infers a corresponding relationship between pixels of the target object comprised in the normalized image and points on a surface of the target object in a space from which the input image is acquired, based on the spatial transformation relationship in which the perspective projection feature is reflected independent of a pose of the target object comprised in the normalized image.

4. The operating method of claim 2, wherein the determining of the second coordinate system comprises:

determining a target x-axis corresponding to an x-axis of the first coordinate system;

determining a target z-axis corresponding to a unit vector from an origin of the first coordinate system toward an origin of a third coordinate system which is a coordinate system of the target object;

determining a target y-axis based on the target z-axis and the target x-axis; and determining the target x-axis, the target y-axis, and the target z-axis to be the second coordinate system.

5. The operating method of claim 1, further comprising:

determining whether the target object is in the input image; and in response to the target object being in the input image, determining orthographic projection-based initial head pose information from the input image, wherein the setting of the normalized virtual camera comprises:

setting the normalized virtual camera based on the initial head pose information.

6. The operating method of claim 1, wherein the AI model is trained based on a training data set comprising a plurality of training images and a ground truth (GT) of feature information corresponding to the plurality of training images, wherein the plurality of training images comprises:

a reference image comprising a reference target object, and augmented images which are images augmented from the reference image in a three-dimensional (3D) space based on an error range that is based on settings of the normalized virtual camera to reduce an error in at least one of a position and a pose of the target object comprised in the normalized image that is potentially caused by the settings of the normalized virtual camera, wherein the GT of the feature information corresponding to the plurality of training images comprises:

a GT of feature information corresponding to the reference image, and augmented GTs which are GTs augmented from the GT of the feature information corresponding to the reference image in the 3D space.

7. The operating method of claim 1, wherein the target object is a face, and wherein the AI model is configured to:

output, based on a perspective projection model, the feature information comprising at least one of 3D face shape information, 3D head pose information, first 3D gaze information, second 3D gaze information, 3D landmark information, 2D landmark information, face part information, and facial expression information of the face, wherein the first 3D gaze information and the second 3D gaze information are based on a second coordinate system which is a coordinate system of the normalized virtual camera and a third coordinate system which is a coordinate system of the face, respectively.

8. The operating method of claim 7, wherein the 3D head pose information comprises a transformation relationship between the second coordinate system and the third coordinate system.

9. The operating method of claim 1, wherein the transforming into the first coordinate system comprises:

transforming the feature information of the target object into the first coordinate system, based on 3D head pose information comprising a transformation relationship between a second coordinate system which is a coordinate system of the normalized virtual camera and a third coordinate system which is a coordinate system of the target object, comprised in the feature information of the target object, and on a transformation relationship between the first coordinate system and the second coordinate system.

10. The operating method of claim 1, wherein the target object is a face, and the operating method further comprises:

determining a confidence of each of 3D gaze information and 2D landmark information comprised in the feature information of the face; and determining whether to output the feature information of the face based on the confidence of each of the 3D gaze information and the 2D landmark information.

11. A non-transitory computer-readable storage medium storing instructions that, when executed by a processor, cause the processor to perform the operating method of claim 1.

12. An operating method of an electronic device, comprising:

generating a training data set comprising a plurality of training images and a ground truth (GT) of feature information corresponding to the plurality of training images; and training, based on the training data set, an artificial intelligence (AI) model such that the AI model outputs the feature information corresponding to the plurality of training images in response to the training images being received, wherein the plurality of training images comprises:

a reference image comprising a reference target object, and augmented images which are images augmented from the reference image in a three-dimensional (3D)

space based on an error range that is based on settings of a normalized virtual camera to reduce an error in at least one of a position and a pose of a target object comprised in a normalized image that is potentially caused by the settings of the normalized virtual camera, wherein the GT of the feature information corresponding to the plurality of training images comprises:

a GT of feature information corresponding to the reference image, and augmented GTs which are GTs augmented from the GT of the feature information corresponding to the reference image in the 3D space.

13. The operating method of claim 12, wherein the target object is a face, and wherein the training of the AI model comprises:

training the AI model such that the AI model outputs the feature information corresponding to the training images comprising at least one of 3D face shape information, 3D head pose information, first 3D gaze information, second 3D gaze information, 3D landmark information, 2D landmark information, face part information, and facial expression information of a face comprised in the training images, wherein the first 3D gaze information and the second 3D gaze information are based on a coordinate system of the normalized virtual camera and a coordinate system of the face, respectively.

14. The operating method of claim 13, wherein the training of the AI model comprises:

training the AI model such that at least one of a first loss that is based on 3D face shape information and 3D head pose information, a second loss that is based on the 3D head pose information and first 3D gaze information, or a third loss that is based on the 3D head pose information and 3D landmark information is minimized.

15. An electronic device comprising:

a memory comprising instructions; and a processor configured to execute the instructions, wherein the instructions, when executed individually and/or collectively by the processor, cause the electronic device to:

acquire, via a camera, an input image comprising a target object;

set a normalized virtual camera for generating a normalized image that preserves a perspective projection feature from the input image;

generate, based on the normalized virtual camera, the normalized image comprising the perspective projection feature that comprises the target object;

input the normalized image comprising the perspective projection feature to an artificial intelligence (AI) model trained to extract feature information of the target object; and transform the feature information of the target object output from the AI model into a first coordinate system of the camera, using a spatial transformation relationship between the camera and the normalized virtual camera.

16. The electronic device of claim 15, wherein the instructions, when executed individually and/or collectively by the processor, cause the electronic device to:

determine a second coordinate system which is a coordinate system of the normalized virtual camera; and arrange the normalized virtual camera having the second coordinate system such that the normalized virtual camera is away from the target object by a predetermined distance.

17. The electronic device of claim 16, wherein the instructions, when executed individually and/or collectively by the processor, cause the electronic device to:

determine a target x-axis corresponding to an x-axis of the first coordinate system;

determine a target z-axis corresponding to a unit vector from an origin of the first coordinate system toward an origin of a third coordinate system which is a coordinate system of the target object;

determine a target y-axis based on the target z-axis and the target x-axis; and determine the target x-axis, the target y-axis, and the target z-axis to be the second coordinate system.

18. The electronic device of claim 15, wherein the instructions, when executed individually and/or collectively by the processor, cause the electronic device to:

determine whether the target object is in the input image; and in response to the target object being in the input image, determine orthographic projection-based initial head pose information from the input image and set the normalized virtual camera based on the initial head pose information.

19. The electronic device of claim 15, wherein the AI model is trained based on a training data set comprising a plurality of training images and a ground truth (GT) of feature information corresponding to the plurality of training images, wherein the plurality of training images comprises:

a reference image comprising a reference target object, and augmented images which are images augmented from the reference image in a three-dimensional (3D) space based on an error range that is based on settings of the normalized virtual camera to reduce an error in at least one of a position and a pose of the target object comprised in the normalized image that is potentially caused by the settings of the normalized virtual camera, wherein the GT of the feature information corresponding to the plurality of training images comprises:

a GT of feature information corresponding to the reference image, and augmented GTs which are GTs augmented from the GT of the feature information corresponding to the reference image in the 3D space.

20. The electronic device of claim 15, wherein the target object is a face, and wherein the AI model is configured to:

output, based on a perspective projection model, the feature information comprising at least one of 3D face shape information, 3D head pose information, first 3D gaze information, second 3D gaze information, 3D landmark information, 2D landmark information, face part information, and facial expression information of the face, wherein the first 3D gaze information and the second 3D gaze information are based on a second coordinate system which is a coordinate system of the normalized virtual camera and a third coordinate system which is a coordinate system of the face, respectively.

* * * * *